(12) United States Patent
Ahn et al.

(10) Patent No.: US 12,549,762 B2
(45) Date of Patent: Feb. 10, 2026

(54) METHOD AND APPARATUS FOR VIDEO CODING USING INTRA PREDICTION BASED ON TEMPLATE MATCHING

(71) Applicants: HYUNDAI MOTOR COMPANY, Seoul (KR); KIA CORPORATION, Seoul (KR); DIGITALINSIGHTS INC., Seoul (KR)

(72) Inventors: Yong Jo Ahn, Seoul (KR); Jong Seok Lee, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 0 days.

(21) Appl. No.: 18/665,065

(22) Filed: May 15, 2024

(65) Prior Publication Data

US 2024/0305815 A1 Sep. 12, 2024

Related U.S. Application Data

(63) Continuation of application No. PCT/KR2022/013976, filed on Sep. 19, 2022.

(30) Foreign Application Priority Data

Nov. 19, 2021 (KR) .......................... 10-2021-0160587
Sep. 16, 2022 (KR) .......................... 10-2022-0116837

(51) Int. Cl.
*H04N 19/105* (2014.01)
*H04N 19/169* (2014.01)
(Continued)

(52) U.S. Cl.
CPC ......... *H04N 19/593* (2014.11); *H04N 19/105* (2014.11); *H04N 19/172* (2014.11);
(Continued)

(58) Field of Classification Search
CPC .... H04N 19/52; H04N 19/105; H04N 19/132; H04N 19/593
See application file for complete search history.

(56) References Cited

U.S. PATENT DOCUMENTS 10,219,003 B2   2/2019 Huang et al.
11,297,340 B2 * 4/2022 Chien .................... H04N 19/52
(Continued)

FOREIGN PATENT DOCUMENTS

| KR | 101691199 B1 | 12/2016 |
| KR | 101909170 B1 | 10/2018 |
| KR | 20210006355 A | 1/2021 |

OTHER PUBLICATIONS

Fast Template Matching for Intra prediction; Venugopal—2017; (Year: 2017).*
(Continued)

*Primary Examiner* — Luis Perez-Fuentes
(74) *Attorney, Agent, or Firm* — Lempia Summerfield Katz LLC

(57) ABSTRACT

A method and an apparatus for video coding using template matching-based intra prediction are disclosed. The video coding method and the video coding apparatus select an intra predictor by defining previously reconstructed pixels spatially adjacent to the current block as a template and performing a template matching-based search in the previously reconstructed region neighboring the current block.

7 Claims, 14 Drawing Sheets

(51) Int. Cl.
  *H04N 19/172* (2014.01)
  *H04N 19/176* (2014.01)
  *H04N 19/436* (2014.01)
  *H04N 19/593* (2014.01)
  *H04N 19/156* (2014.01)

(52) U.S. Cl.
  CPC ....... *H04N 19/176* (2014.11); *H04N 19/1883* (2014.11); *H04N 19/436* (2014.11); *H04N 19/156* (2014.11)

(56) References Cited

U.S. PATENT DOCUMENTS

| | | | | |
|---|---|---|---|---|
| 11,778,176 B2* | 10/2023 | Xu | ........................ | H04N 19/11 375/240.12 |
| 11,805,245 B2* | 10/2023 | Chiu | .................... | H04N 19/105 |
| 11,831,869 B2* | 11/2023 | Zhang | .................... | H04N 19/96 |
| 11,917,176 B2* | 2/2024 | Zhou | .................... | H04N 19/513 |
| 11,956,439 B2* | 4/2024 | Deng | .................. | H04N 19/132 |
| 2011/0261882 A1 | 10/2011 | Zheng | | |
| 2017/0078696 A1 | 3/2017 | Huang et al. | | |
| 2021/0076058 A1 | 3/2021 | Robert | | |
| 2023/0097304 A1 | 3/2023 | Robert | | |

OTHER PUBLICATIONS

Intra region-based template matching; Venugopal—2018; (Year: 2018).*

Intra template matching; Naser—2021; (Year: 2021).*

Gayathri Venugopal et al., Intra Region-based Template Matching, JVET-J0039, Joint Video Exploration Team (JVET) of ITU-T SG 16 WP 3 and ISO/IEC JTC 1/SC 29/WG 11, 10th Meeting: San Diego, Apr. 3, 2018, 13pp.

International Search Report and Written Opinion cited in corresponding international patent application No. PCT/KR2022/013976; Dec. 13, 2022; 10 pp.

K. Naser et al., EE2: Intra Template Matching, JVET-V0130-v6, Joint Video Experts Team (JVET) of ITU-T SG 16 WP 3 and ISO/IEC JTC 1/SC 29, 22nd Meeting, by teleconference, Apr. 23, 2021, 8 pp.

* cited by examiner

METHOD AND APPARATUS FOR VIDEO CODING USING INTRA PREDICTION BASED ON TEMPLATE MATCHING

CROSS-REFERENCE TO RELATED APPLICATIONS

This application is a continuation of International Application No. PCT/KR2022/013976 filed on Sep. 19, 2022, which claims priority to and the benefit of Korean Patent Application No. 10-2021-0160587, filed on Nov. 19, 2021, and Korean Patent Application No. 10-2022-0116837, filed on Sep. 16, 2022, the entire disclosures of each of which are incorporated herein by reference.

TECHNICAL FIELD

The present disclosure relates to a video coding method and an apparatus using template matching-based intra prediction.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Intra prediction is a technology that when performing prediction on the current block, generates prediction signals by using spatially adjacent neighbor pixels within the same picture. To improve the coding performance of the intra-prediction technology, existing video encoding/decoding methods and devices use an increased number of intra-prediction modes, or filtering is applied to spatially adjacent neighbor pixels that are used in intra prediction. This intra-prediction technology has relatively low generation performance for predicted signals compared to the inter-prediction technology due to the restriction of using limited pixels in the same picture as the current block when generating predicter signals.

To improve the prediction performance of intra prediction, multiple line buffers may be utilized in addition to the spatially adjacent pixels. For example, a multiple reference line (MRL) intra-prediction technique performs intra prediction by selecting one of multiple pixel lines located at a specific distance. Additionally, there is also a matrix weighted intra prediction (MIP) technique that generates intra-prediction signals by using a product operation between neighbor pixels and a predefined matrix. Therefore, to improve video coding efficiency and improve picture quality, an intra-prediction method needs to be improved further.

SUMMARY

The present disclosure seeks to provide a video coding method and a video coding apparatus for selecting an intra predictor to improve video coding efficiency and enhance video quality. The video coding method and the video coding apparatus define previously reconstructed pixels spatially adjacent to the current block as a template and perform a template matching-based search in the previously reconstructed region neighboring the current block.

At least one aspect of the present disclosure provides a method performed by a video decoding apparatus for decoding a current block. The method includes decoding, from a bitstream, an index indicating a search region that is one of one or more search regions. Here, the search region is a portion of a previously reconstructed region in a current picture. The method also includes setting the search region based on the index and setting a template from pixels spatially adjacent to the current block. The method also includes searching for a similar template with a highest degree of similarity to the template by performing a search based on template matching in the search region. The method also includes determining a matching block with the current block based on the similar template and selecting the matching block as an intra predictor.

Another aspect of the present disclosure provides a method performed by a video encoding apparatus for encoding a current block. The method includes determining an index indicating a search region that is one of one or more search regions. Here, the search region is a portion of a previously reconstructed region in a current picture. The method also includes setting the search region based on the index and setting a template from pixels spatially adjacent to the current block. The method also includes searching for a similar template with a highest degree of similarity to the template by performing a search based on template matching in the search region. The method also includes determining a matching block with the current block based on the similar template and selecting the matching block as an intra predictor.

Yet another aspect of the present disclosure provides a computer-readable recording medium configured to store a bitstream generated by a video encoding method. The video encoding method includes determining an index indicating a search region that is one of one or more search regions. Here, the search region is a portion of a previously reconstructed region in a current picture. The video encoding method also includes setting the search region based on the index and setting a template from pixels spatially adjacent to a current block. The video encoding method also includes searching for a similar template with a highest degree of similarity to the template by performing a search based on template matching in the search region. The video encoding method also includes determining a matching block with the current block based on the similar template and selecting the matching block as an intra predictor.

As described above, the present disclosure provides a video coding method and a video coding apparatus for selecting an intra predictor. The video coding method and the video coding apparatus define previously reconstructed pixels spatially adjacent to the current block as a template and perform a template matching-based search in the previously reconstructed region neighboring the current block.

Thus, the video coding method and the video coding apparatus may improve video coding efficiency and may enhance video quality.

DETAILED DESCRIPTION

Figure 1:
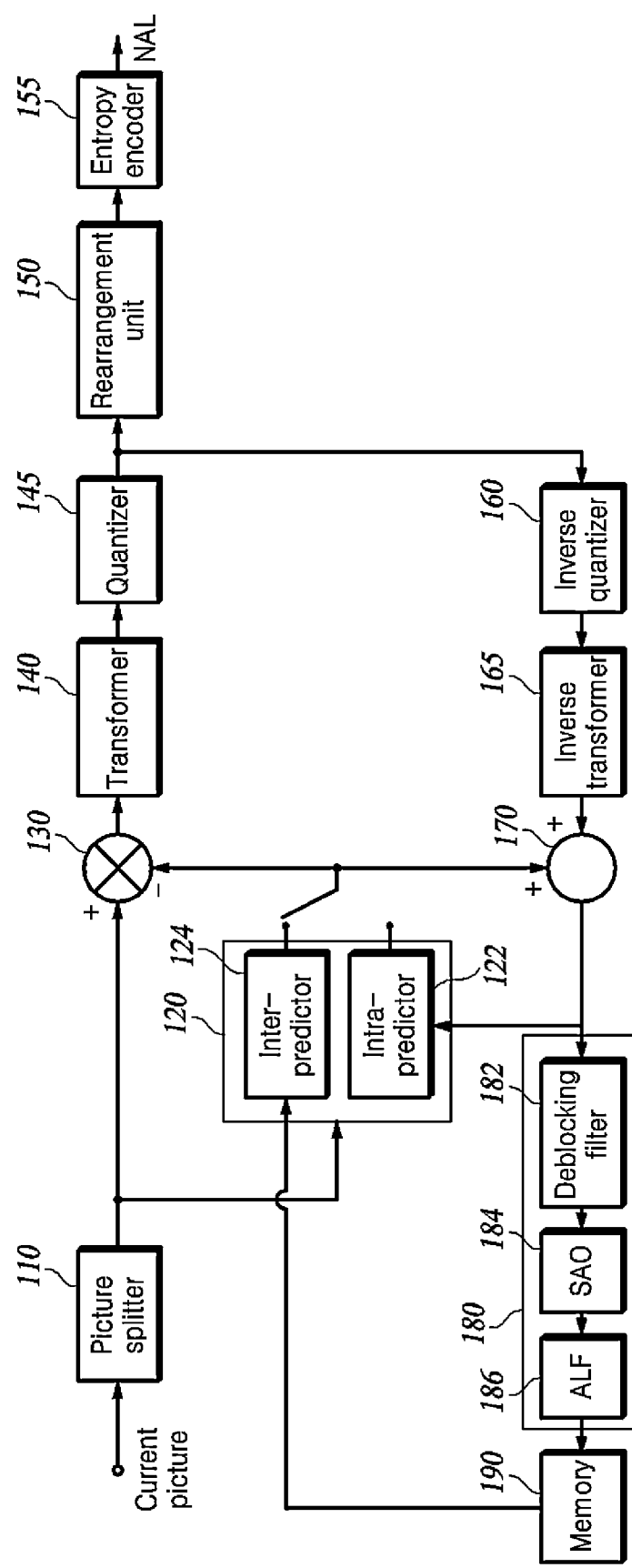
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
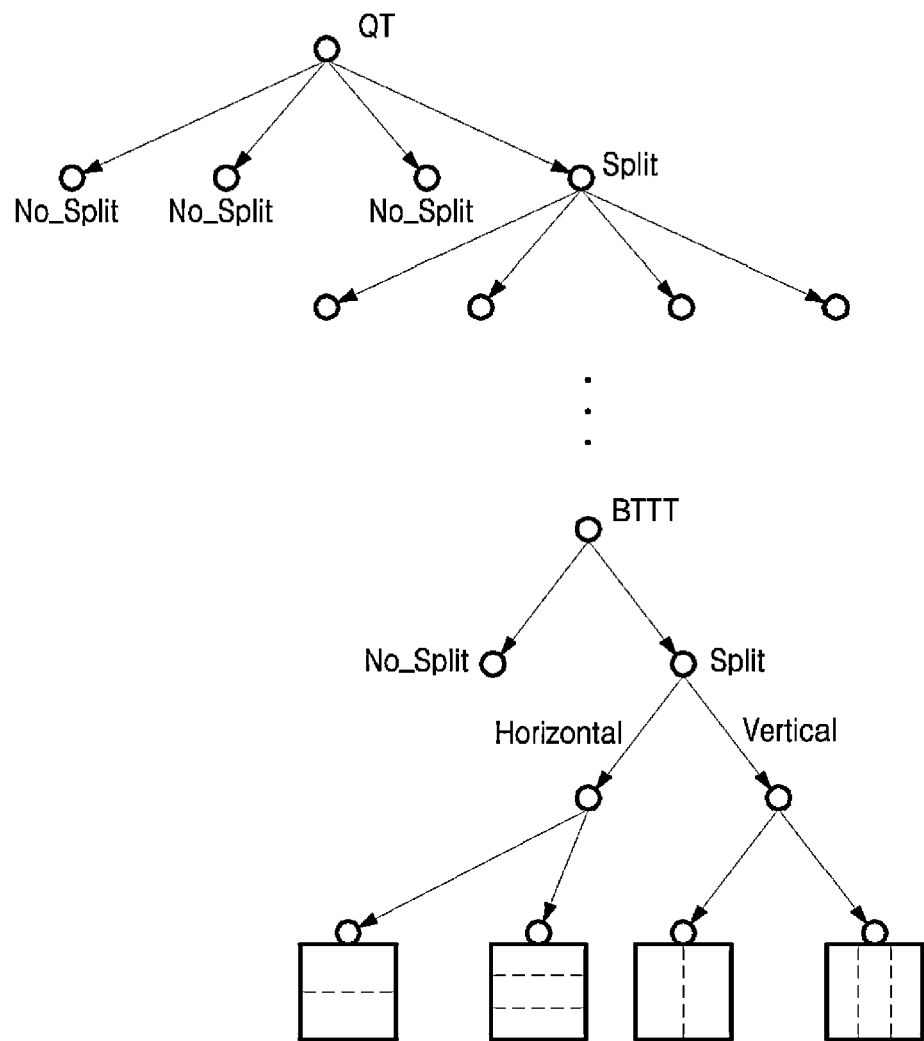
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
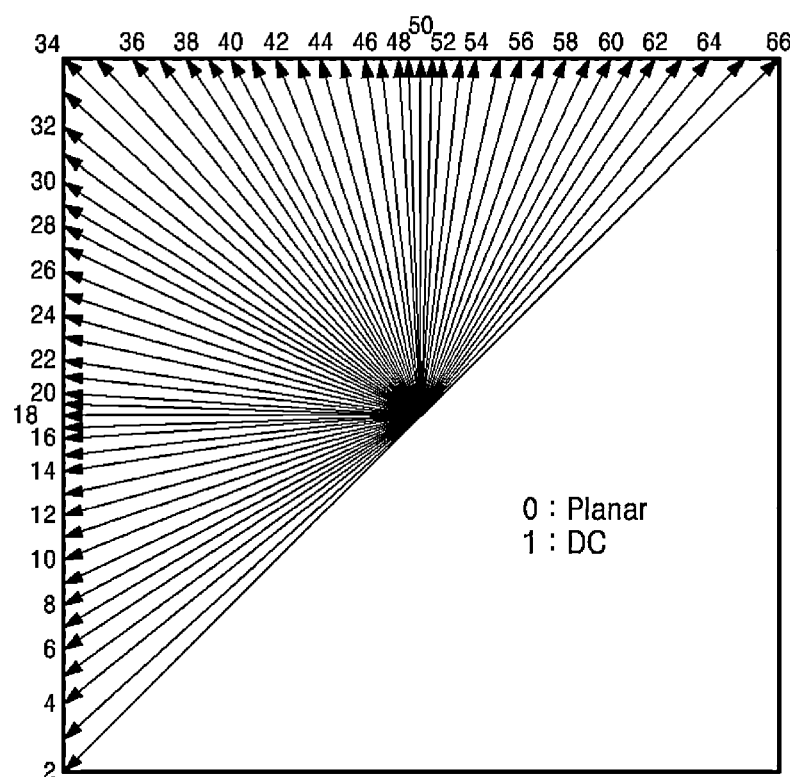
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
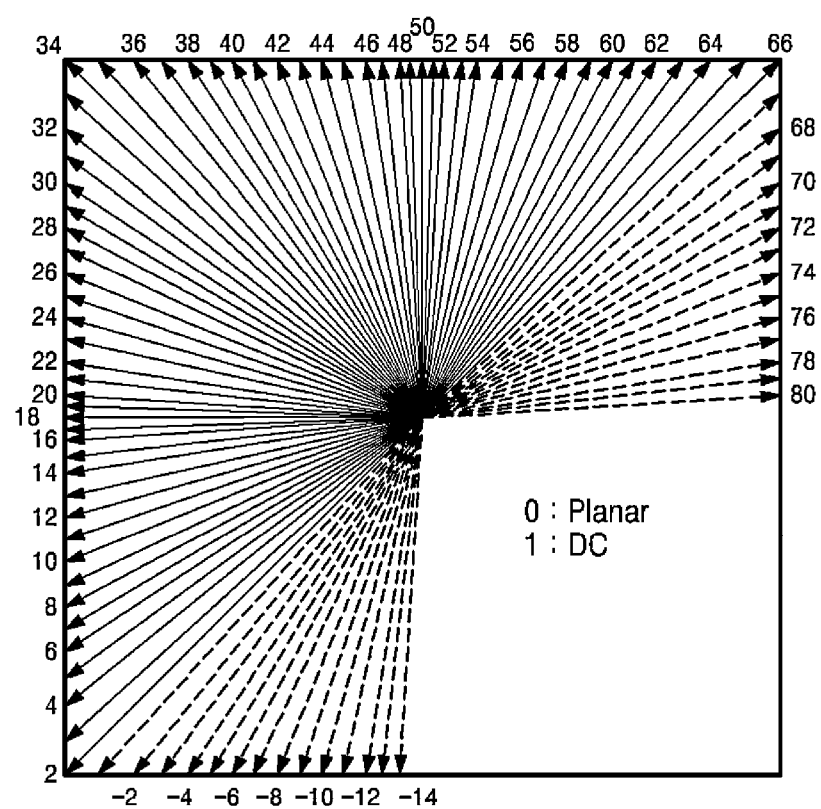

For efficient directional prediction for the current block having a rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
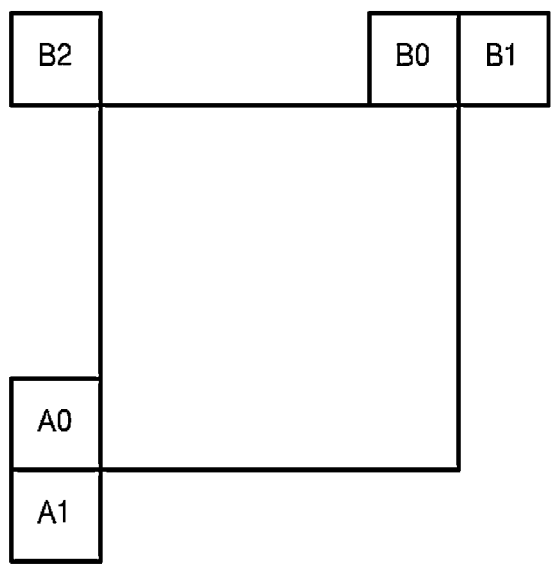
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value, average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
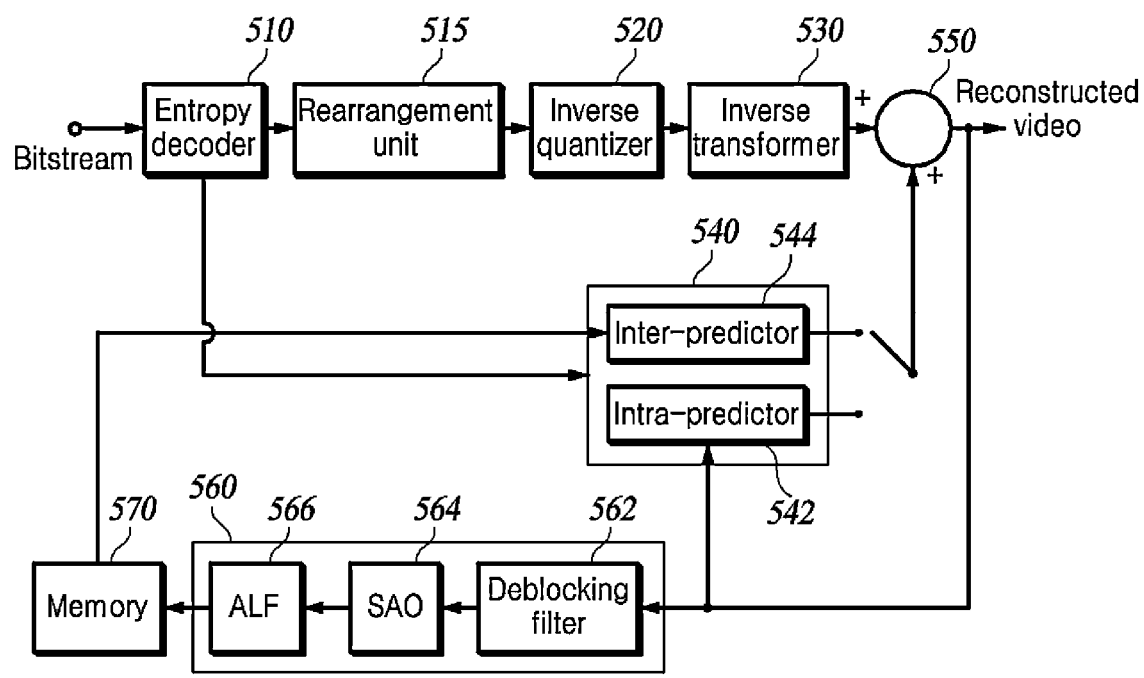
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and a video coding apparatus that select an intra predictor by defining previously reconstructed pixels spatially adjacent to the current block as a template and performing a template matching-based search in a previously reconstructed region neighboring the current block.

The following embodiments may be performed by the intra predictor 122 in the video encoding apparatus and by the intra predictor 542 in the video decoding apparatus.

The video encoding apparatus, when performing the intra prediction of the current block, may generate signaling information related to the present embodiment in terms of optimizing rate-distortion. The video encoding apparatus may encode the signaling information by using the entropy encoder 155 and may transmit the encoded signaling information to the video decoding apparatus. The video decoding apparatus may decode the signaling information from the bitstream by using the entropy decoder 510.

Further, a value of true for a flag indicates a case of setting the flag to 1. Additionally, a value of false for a flag indicates a case of setting the flag to 0.

I. Template Matching-Based Intra Prediction

Figure 6:
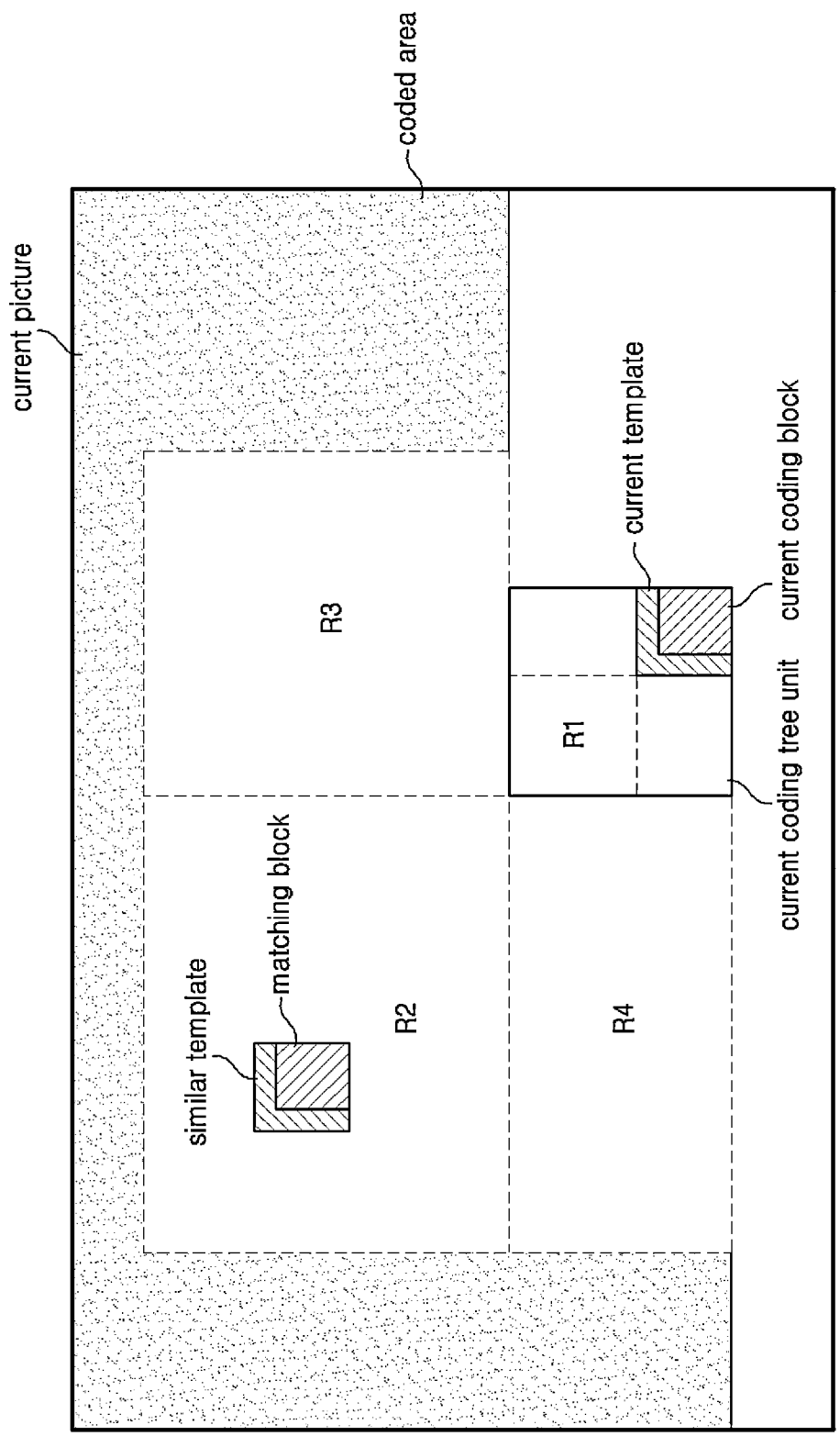
FIG. 6 is a diagram conceptually illustrating a template matching-based intra prediction.

FIG. 6 is a diagram conceptually illustrating a template matching-based intra prediction.

As illustrated in FIG. 6, a video encoding device or a video decoding device may use the template matching-based intra prediction technology with respect to the block to be currently encoded/decoded (i.e., 'current block') for obtaining the optimal intra predictor from the previously reconstructed region (i.e., 'coded area') within the current picture. At this time, a set of pixels spatially adjacent to the current block is defined as a template. The video encoding device or the video decoding device performs a template matching-based search in the aforementioned previously reconstructed region to search for a similar template with the highest similarity to the template of the current block. The video encoding device or video decoding device determines, based on the similar template, the location of a matching block with the current block and then selects the matching block as the optimal intra predictor of the current block.

Meanwhile, the existing intra block copy (IBC) technology uses a method of searching for the block position most similar to the current block within the current picture and then signaling the similar block position as a block vector. Additionally, when transmitting the block vector information, a video encoding device selects a block vector predictor among blocks adjacent to the current block and then signals an index for the selected block vector predictor and a block vector difference between the block vector and the block vector predictor.

A conventionally used method to efficiently improve the signaling method of the aforementioned block vector information involves delimiting the template matching-based search region for the current block to a predefined region within the previously reconstructed region. An example method as illustrated in FIG. 6 classifies a portion of the previously reconstructed region into at least one or more rectangular search regions (R1, R2, R3, and R4), and uses one of the classified search regions as a region subject to the template matching-based search. Additionally, signaling overhead could have been reduced between a video encoding device and a video decoding device by delimiting the region containing the optimal block location matching with the current block as follows.

Among the delimited regions, the R1 search region represents a previously reconstructed region located within a current coding tree unit (CTU). If the optimal intra predictor search position of the current block is in the R1 region, the video encoding device may signal an index of the search region, which is mapped to the R1 region. The video decoding device may follow the same method as that of the video encoding device to select the template of the current block and then, based on the transmitted index of the search region, may search for the location of a template matching-based optimal intra predictor by using that same template in the R1 region.

The R2 region represents a previously reconstructed region located on the top left side relative to the current CTU. If the optimal intra predictor search location of the current block is in the R2 region, the video encoding device may signal an index mapped to the R2 region. The video decoding device may select the template of the current block and then, based on the transmitted index, may search for the location of a template matching-based optimal intra predictor by using that same template in the R2 region.

The R3 region represents a previously reconstructed region located on the top side relative to the current CTU. If the optimal intra predictor search location of the current block is in the R3 region, the video encoding device may signal an index mapped to the R3 region. The video decoding device may select the template of the current block and then, based on the transmitted index, may search for the location of a template matching-based optimal intra predictor by using that same template in the R3 region.

The R4 region represents a previously reconstructed region located on the left side of the current CTU. If the optimal intra predictor search location of the current block is in the R4 region, the video encoding device may signal an index mapped to the R4 region. The video decoding device may select the template of the current block and then, based on the transmitted index, may search for the location of a template matching-based optimal intra predictor by using that same template in the R4 region.

Meanwhile, information on the search region according to the index of the search region may be predefined according to an agreement between the video encoding device and the video decoding device. Alternatively, the video encoding device may encode the information on the search region and then may signal the information on the search region to the video decoding device. Here, the information on the search region may include information indicating the size and location of the search region.

The video encoding device or video decoding device may use the Sum of Absolute Difference (SAD), Sum of Squared Difference (SSD), and the like, as a cost function for template matching to calculate the degree of similarity between the template of the current block and the candidate template within the previously reconstructed region. At this time, the block corresponding to the template with the smallest cost function value may be selected as the predictor of the current block.

In addition, in calculating the cost function value, when the template of the current block is larger than a predefined width or a predefined height, the video encoding device or video decoding device may calculate the cost function value by using pixels obtained by sub-sampling the template.

The following describes methods for not only using one of the regions illustrated in FIG. 6 as a search region for the current block but also delimiting the intra predictor search region to be suitable for hardware implementation and pipelined processing.

II. Template Matching-Based Intra Prediction According to Present Disclosure

Figure 7:
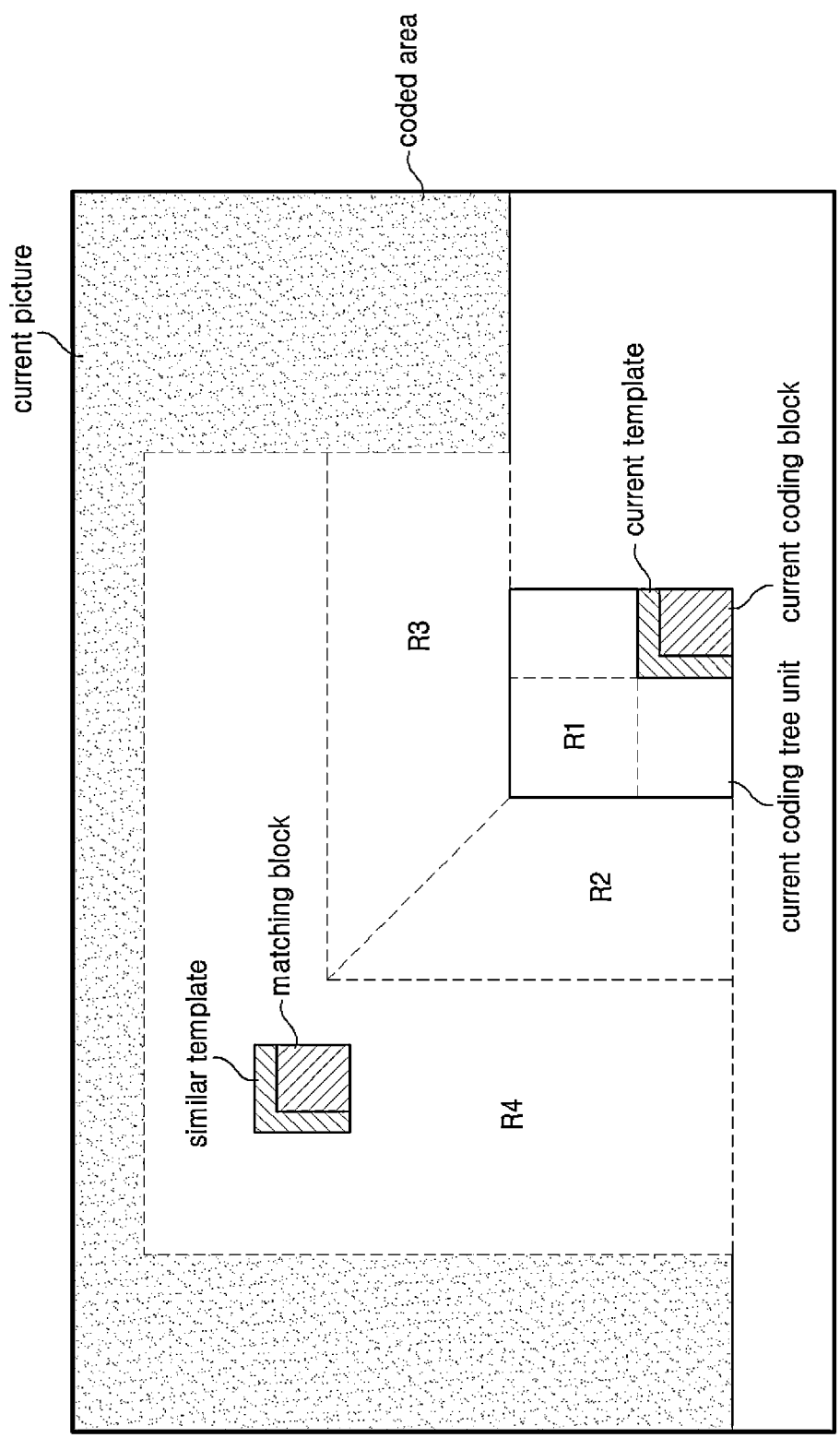
FIG. 7 is a diagram illustrating search regions subject to template matching, according to at least one embodiment of the present disclosure.

FIG. 7 is a diagram illustrating search regions subject to template matching, according to at least one embodiment of the present disclosure.

As illustrated in FIG. 7, the video encoding device and the video decoding device may use the template matching-based intra-prediction technology to obtain the optimal intra predictor in search regions within a predefined region for the current block.

Different from those predefined rectangular search regions as illustrated in FIG. 6, the video encoding device and the video decoding device according to the present embodiments use arbitrarily shaped search regions (R1, R2, R3, and R4) as illustrated in FIG. 7 for template matching-based intra prediction. As mentioned above, these search regions are portions of the previously reconstructed region of the current block. The R1 region represents the region located within the current coding tree unit (CTU). Additionally, the R2 region and R3 region represent an L-shaped region that has a predefined width and a predefined height at the top and left of the current CTU. At this time, the L-shaped region is bisected diagonally into two regions, of which the left region is indicated as the R2 region and the top region is indicated as the R3 region. Additionally, the R4 region represents an L-shaped region that has a predefined width and a predefined height at the top and left of the current CTU and is located outside the R2 region and R3 region.

As described by using the illustrated search regions of FIG. 6, the search regions illustrated in FIG. 7 can also be utilized to efficiently improve the signaling method of a block vector. For example, the present disclosure may set the four partition regions as template matching-based search regions and then may delimit, among the search regions, the region containing the optimal predictor of the current block. Thereafter, by signaling the index of the delimited search region, the present disclosure can effectively reduce signaling overhead between the video encoding device and the video decoding device.

As described above, information on the search region according to the index of the search region may be defined in advance according to an agreement between the video encoding device and the video decoding device. Alternatively, the video encoding device may encode information on the search region and then may signal the information on the search region to the video decoding device.

In applying the template matching-based intra-prediction technology, as described above, a predefined previously reconstructed region may be used to search for the template matching-based optimal intra predictor. However, when using an arbitrary previously reconstructed region, the process of designing various hardware supporting this embodiment may encounter limitations with optimal design thereof. Additionally, when applying video encoding and decoding methods and devices that perform pipelined parallel processing in CTU units, the use of an arbitrary previously reconstructed region may encounter issues in applying hardware resources.

Figure 8:
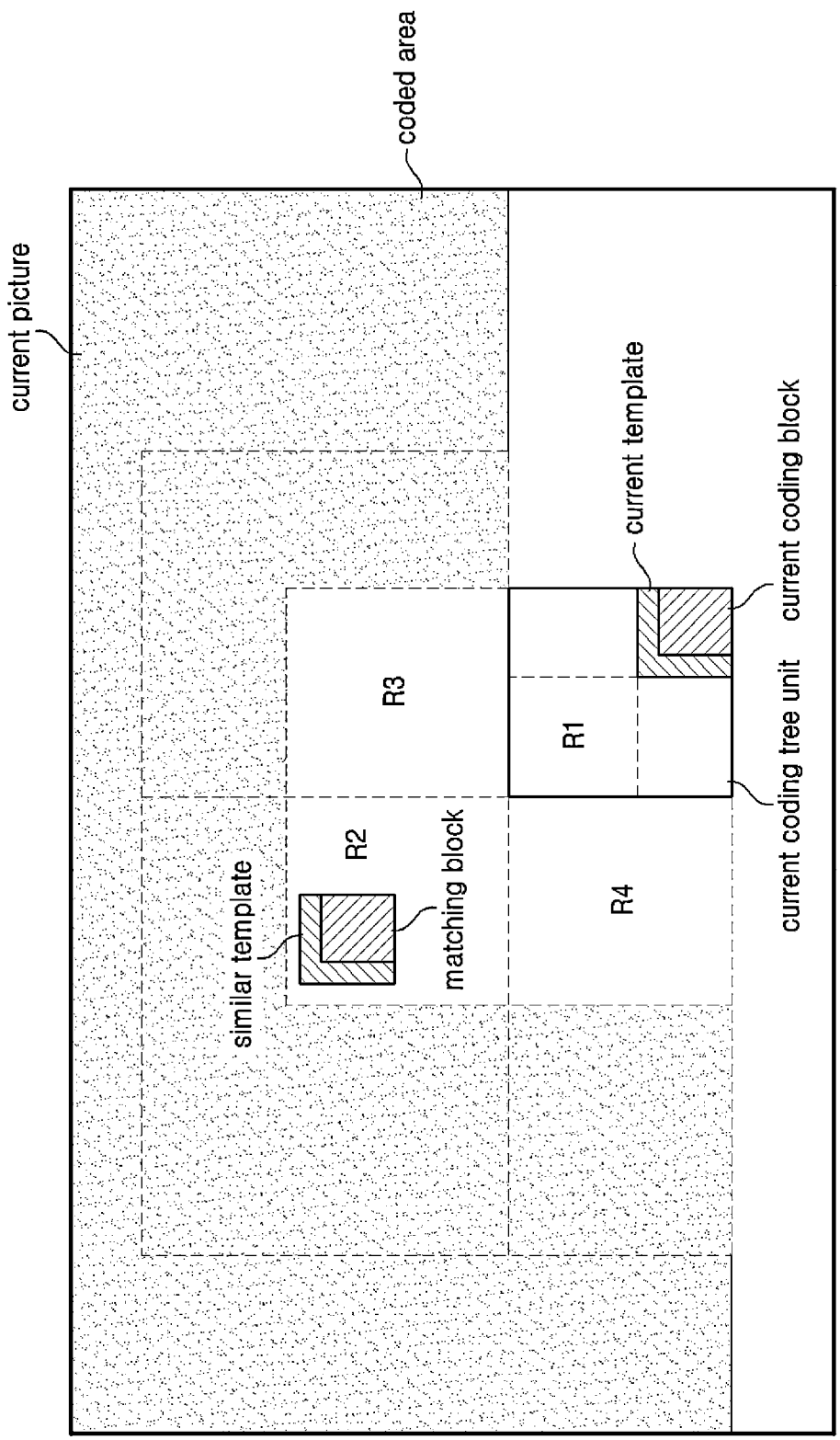
FIG. 8 is a diagram showing the delimitation of search regions to which template matching is applied per a coding tree unit (CTU) basis, according to at least one embodiment of the present disclosure.

FIG. 8 is a diagram showing the delimitation of search regions to which template matching is applied per a CTU basis, according to at least one embodiment of the present disclosure.

As illustrated in FIG. 8, the video encoding device and the video decoding device may use the template matching-based intra-prediction technology to obtain the optimal intra predictor in predefined search regions for the current block.

In the example of FIG. 8, the search regions include an R1 region within the current CTU and include CTUs spatially adjacent to the current CTU. The adjacent CTUs may include a top left R2 CTU, a top R3 CTU, and a left R4 CTU to be used. As mentioned above, these search regions are portions of the previously reconstructed region of the current block. Additionally, the delimitation of these search regions can be more suitable for the optimization of hardware resources, CTU-based pipelined processing, and the like in the above-described hardware design process.

In applying the template matching-based intra-prediction technology, as described above, a pre-defined previously reconstructed region may be used to search for the template matching-based optimal intra predictor. However, when an arbitrary previously reconstructed region is used, difficulties may arise with securing maximum hardware resources while designing hardware that supports this embodiment. Additionally, when video encoding and decoding methods and devices that perform pipelined parallel processing per a specific unit basis are applied, difficulties may also arise with designing the pipelined structure.

Figure 9:
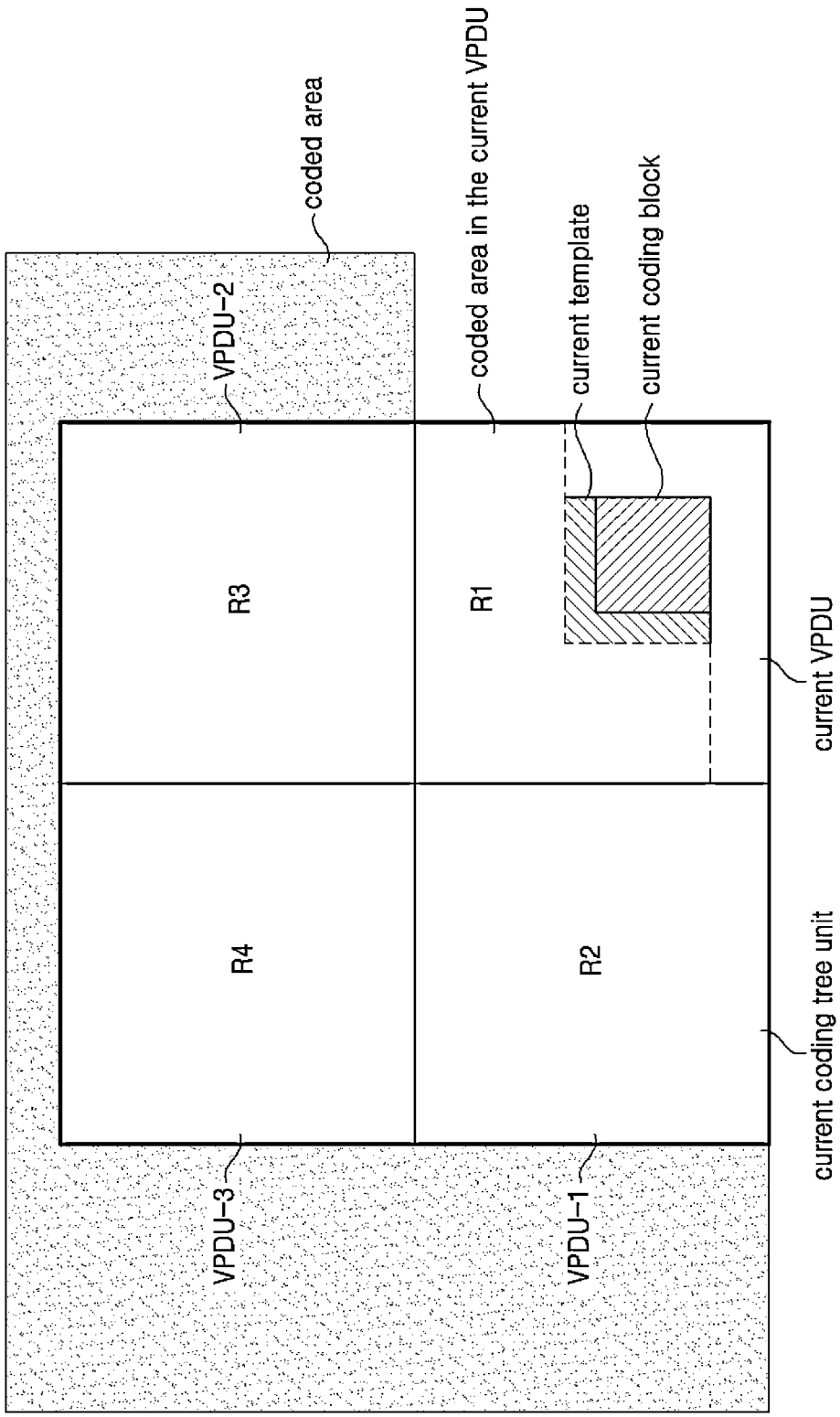
FIG. 9 is a diagram illustrating delimiting search regions to which template matching is applied per a virtual pipeline data unit (VPDU) basis, according to at least one embodiment of the present disclosure.

FIG. 9 is a diagram illustrating delimiting search regions to which template matching is applied per a Virtual Pipeline Data Unit (VPDU) basis, according to at least one embodiment of the present disclosure.

As illustrated in FIG. 9, the video encoding device and the video decoding device may use the template matching-based intra-prediction technology to obtain the optimal intra predictor in predefined search regions for the current block.

In the example of FIG. 9, the search regions include regions in units of Virtual Pipeline Data Unit (VPDU). Here, a VPDU is a data unit that may be processed by a virtual pipeline. VPDU is the largest unit that may perform encoding and decoding each time and may be used to reduce the cost burden of hardware implementation due to an increase in the size of the CTU.

Additionally, VPDU refers to a data processing unit for encoding and decoding but is not necessarily limited to the lexical meaning of VPDU. As the size of the VPDU, a predefined size may be used, and the size of CTU divided by N may be used (where N is a natural number). Additionally, the predefined size may be one of 64×64, 32×32, and 16×16. In the example of FIG. 9, the VPDU has a size that is one quarter of the CTU.

In the example of FIG. 9, the search regions may be delimited to include a previously reconstructed R1 region in the current VPDU containing the current block, a left R2

VPDU or the immediately previous VPDU to the current VPDU, a top R3 VPDU or the second previous VPDU than the current VPDU in Z-order inside the CTU, and a top left R4 VPDU or the third previous VPDU than the current VPDU in Z-order inside the CTU. Here, the Z-order is a zigzag scan order and represents the encoding/decoding order. As mentioned above, these search regions are portions of the previously reconstructed region of the current block. Additionally, the delimitation of these search regions can be more suitable for the optimization of hardware resources, VPDU-unit pipelined processing, and the like in the above-described hardware design process.

Figure 10:
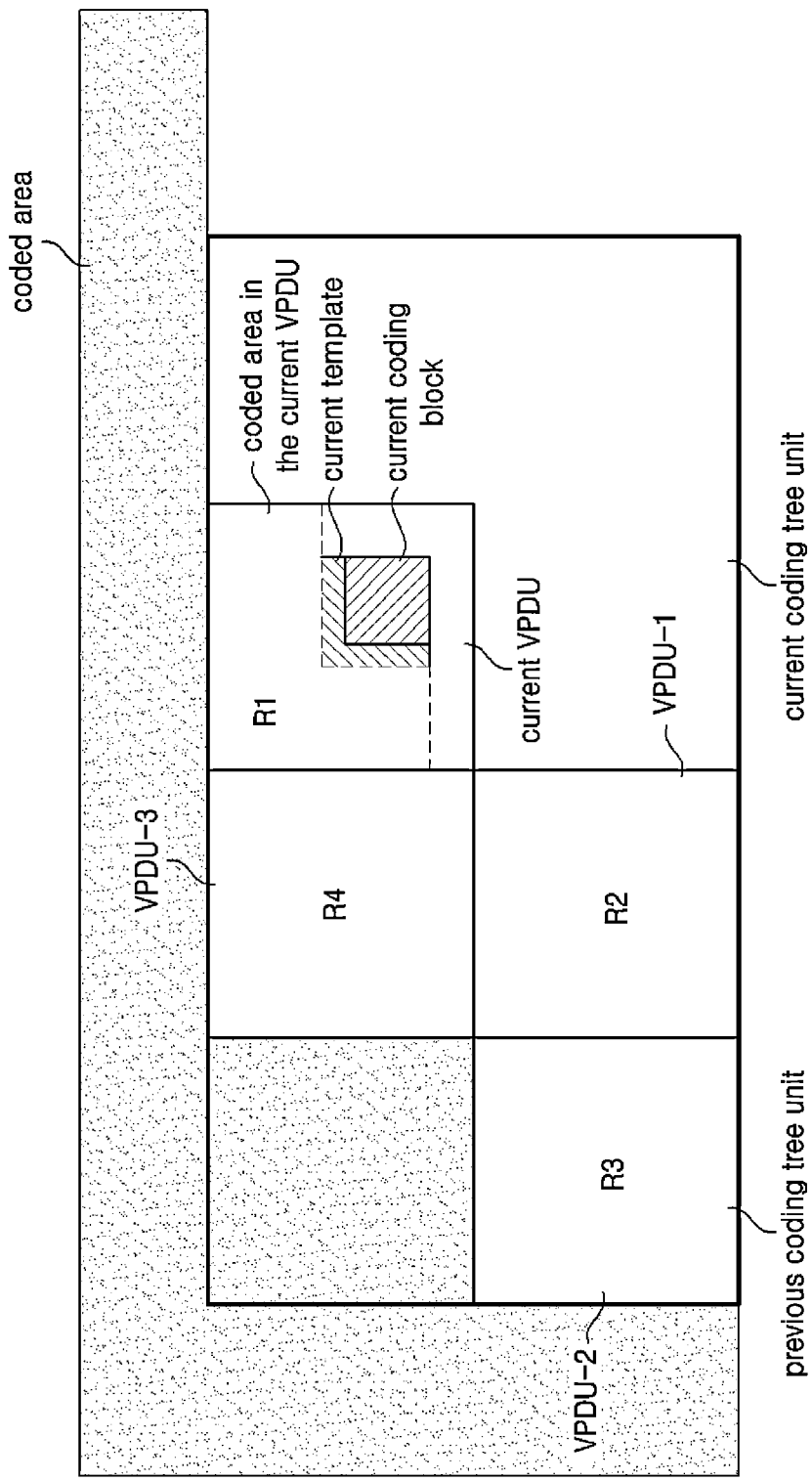
FIG. 10 is a diagram illustrating delimiting search regions to which template matching is applied per a VPDU basis, according to another embodiment of the present disclosure.

FIG. 10 is a diagram illustrating delimiting search regions to which template matching is applied per a VPDU basis, according to another embodiment of the present disclosure.

The example of FIG. 10 is another example to solve issues described above that may occur when designing the hardware. As with the example of FIG. 9, this embodiment sets the search regions subject to the template matching-based intra-prediction technology per a VPDU basis with the search regions being delimited to at least one or more predefined regions of VPDUs.

In the example of FIG. 9, all referenced VPDUs exist in the same CTU region as the current VPDU. On the other hand, in the example of FIG. 10, the current VPDU is the first VPDU in Z-order within the current CTU. Namely, many of the referenced VPDUs are included in the previous CTU region.

In the example of FIG. 10, the search regions may be delimited to include a previously reconstructed R1 region in the current VPDU containing the current block, a bottom right R2 VPDU in the left CTU or the immediately previous VPDU to the current VPDU, a bottom left R3 VPDU in the left CTU or the second previous VPDU than the current VPDU in Z-order, and a top right R4 VPDU in the left CTU or the third previous VPDU than the current VPDU in Z-order. As mentioned above, these search regions are portions of the previously reconstructed region of the current block.

Figure 11:
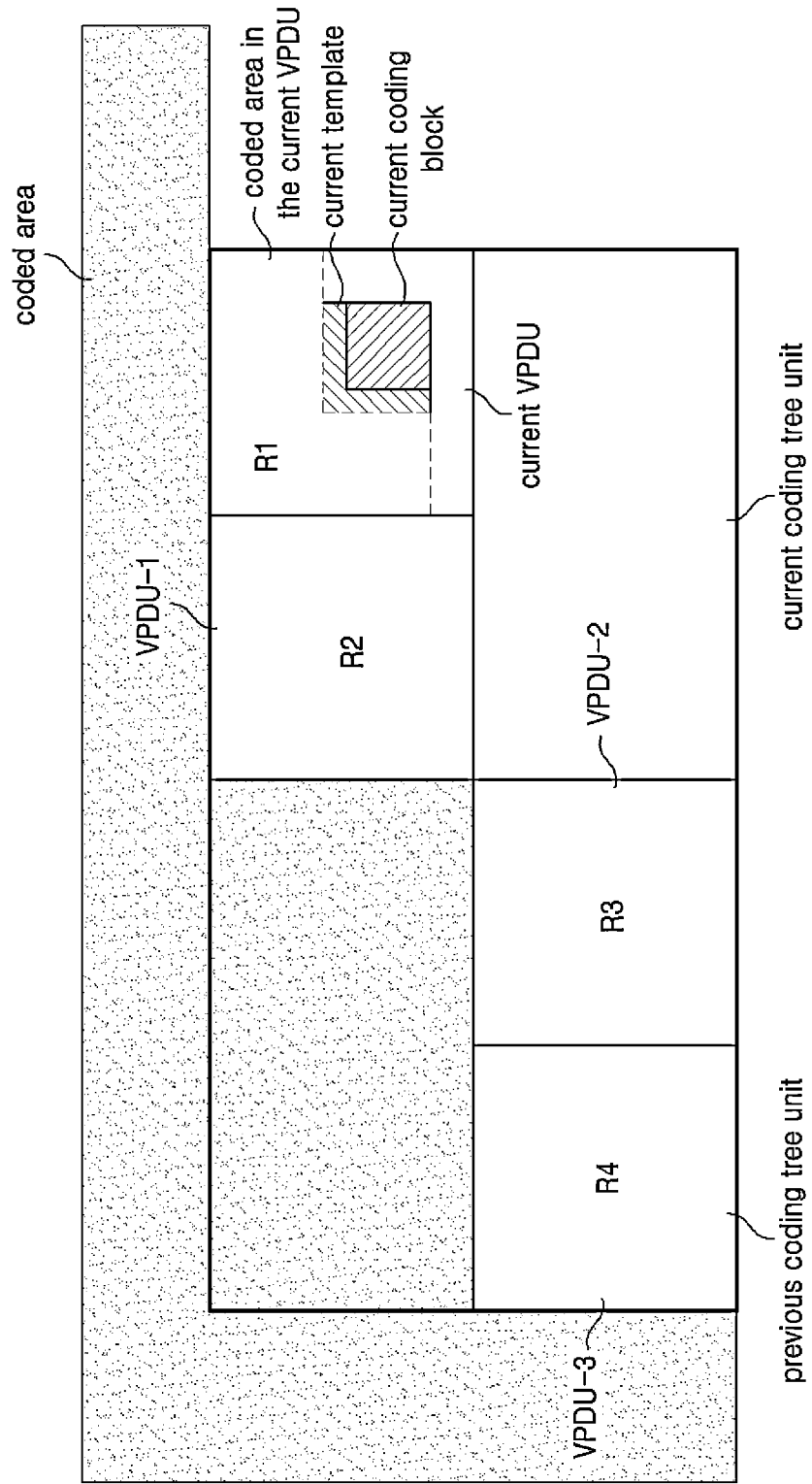
FIG. 11 is a diagram illustrating delimiting search regions to which template matching is applied per a VPDU basis, according to yet another embodiment of the present disclosure.

FIG. 11 is a diagram illustrating delimiting search regions to which template matching is applied per a VPDU basis, according to yet another embodiment of the present disclosure.

In the example of FIG. 9, all referenced VPDUs exist in the same CTU region as the current VPDU. On the other hand, in the example of FIG. 11, the current VPDU is the second VPDU in Z-order within the current CTU. Namely, many of the referenced VPDUs are included in the previous CTU region.

In the example of FIG. 11, the search regions may be delimited to include a previously reconstructed R1 region in the current VPDU containing the current block, a top left R2 VPDU in the current CTU or the immediately previous VPDU to the current VPDU, a bottom right R3 VPDU in the left CTU or the second previous VPDU than the current VPDU in Z-order, and a bottom left R4 VPDU in the left CTU or the third previous VPDU than the current VPDU in Z-order. As mentioned above, these search regions are portions of the previously reconstructed region of the current block.

Figure 12:
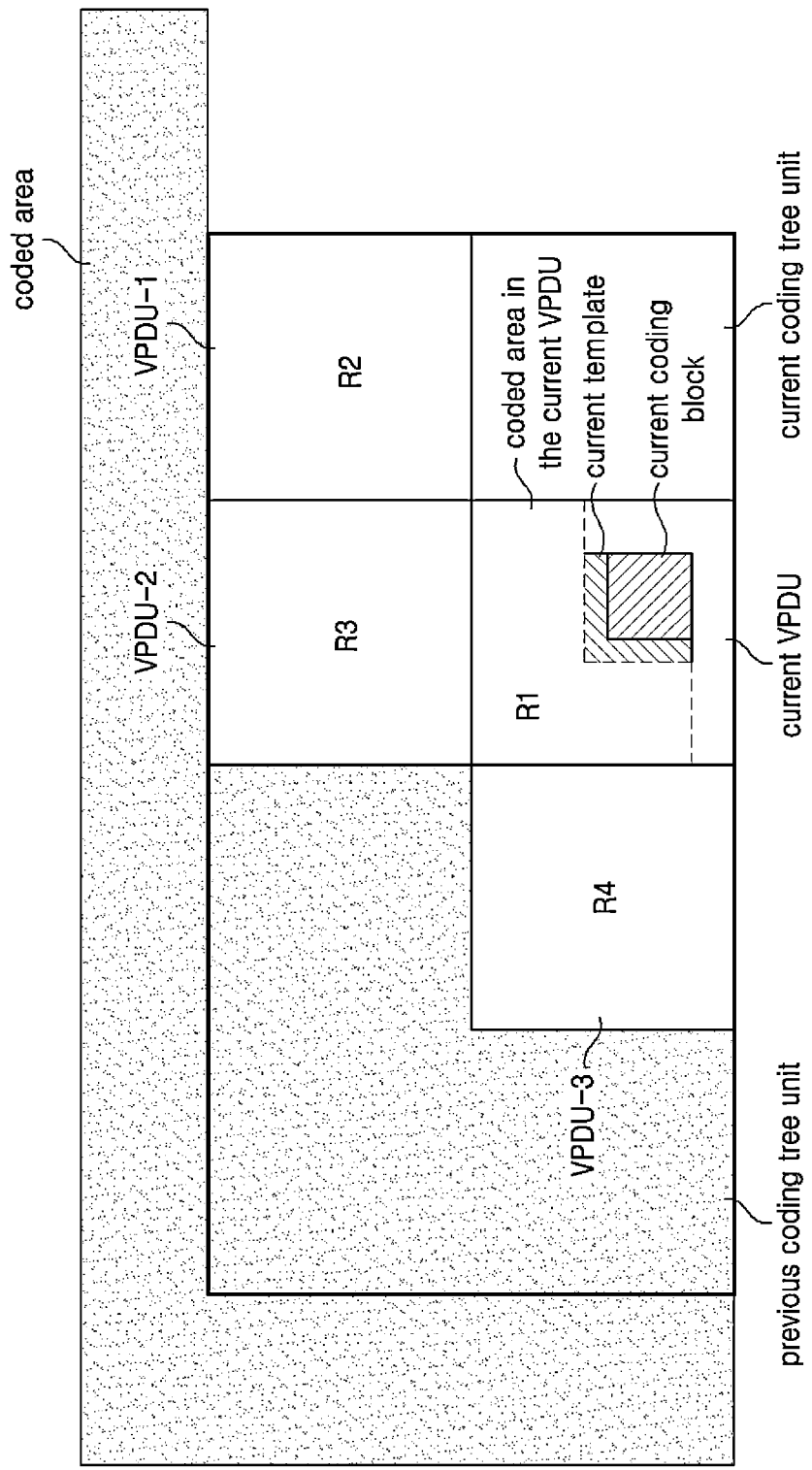
FIG. 12 is a diagram illustrating delimiting search regions to which template matching is applied per a VPDU basis, according to yet another embodiment of the present disclosure.

FIG. 12 is a diagram illustrating delimiting search regions to which template matching is applied per a VPDU basis, according to yet another embodiment of the present disclosure.

In the example of FIG. 9, all referenced VPDUs exist in the same CTU region as the current VPDU. On the other hand, in the example of FIG. 12, the current VPDU is the third VPDU in Z-order within the current CTU. Namely, some of the referenced VPDUs are included in the previous CTU region.

In the example of FIG. 12, the search regions may be delimited to include a previously reconstructed R1 region in the current VPDU containing the current block, a top right R2 VPDU in the current CTU or the immediately previous VPDU to the current VPDU, a top left R3 VPDU in the current CTU or the second previous VPDU than the current VPDU in Z-order, and a bottom right R4 VPDU in the left CTU or the third previous VPDU than the current VPDU in Z-order. As mentioned above, these search regions are portions of the previously reconstructed region of the current block.

Meanwhile, when delimiting the applicable region with the template matching-based intra-prediction technology to the regions in VPDU units, the applicable region may be delimited to at least one or more VPDUs including the current VPDU containing the current block. In the examples of FIGS. 9-12, as a set of embodiments, a total of four VPDUs including the current VPDU containing the current block are used as search regions in the pipelined processing order. However, when the search regions per a VPDU basis under the template matching-based intra-prediction technology are applied, the search regions are not necessarily limited to four VPDUs, and the use of at least one or more VPDUs can also be covered by the scope of the present disclosure.

Figure 13:
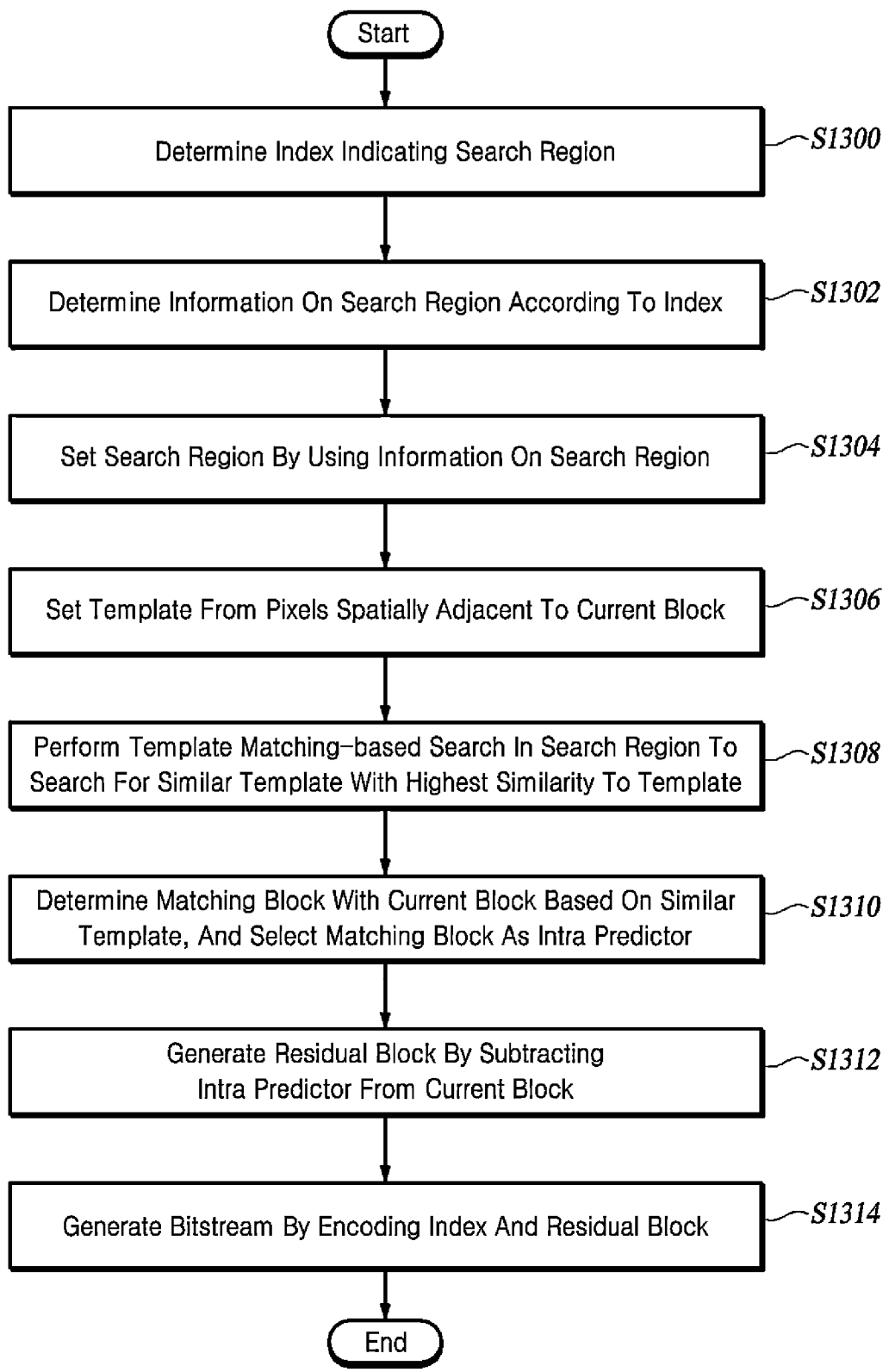
FIG. 13 is a flowchart of a video encoding method according to at least one embodiment of the present disclosure.
Figure 14:
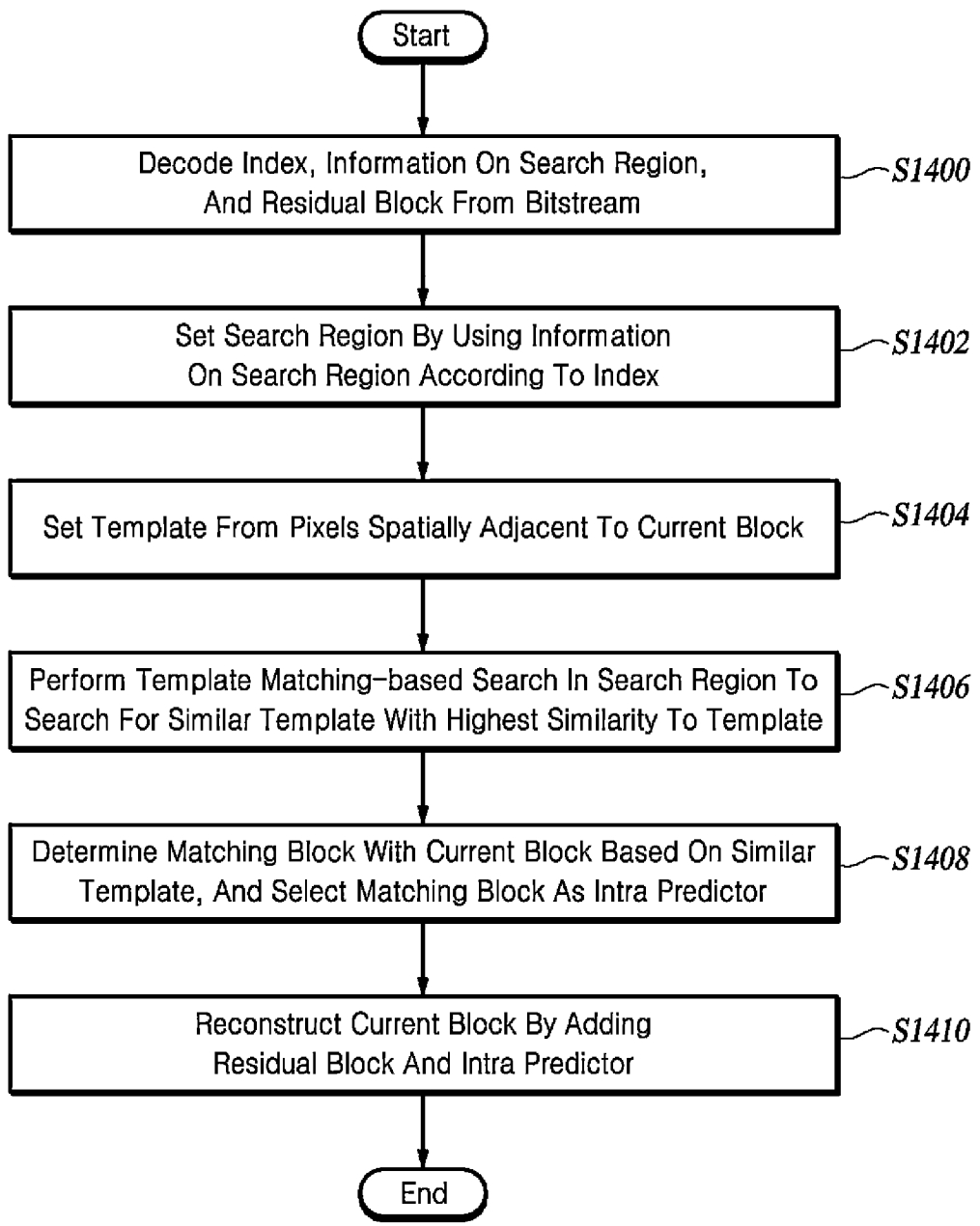
FIG. 14 is a flowchart of a video decoding method according to at least one embodiment of the present disclosure.

The following describes, with reference to FIGS. 13 and 14, a video encoding method and a video decoding method using template matching-based intra prediction.

FIG. 13 is a flowchart of a video encoding method according to at least one embodiment of the present disclosure.

The video encoding device determines an index indicating a search region that is one of one or more search regions (S1300). Here, the search region is a portion of the previously reconstructed region in the current picture.

The video encoding device determines information on the search region according to the index (S1302). The information on the search region according to the index of the search region may be defined in advance according to an agreement between the video encoding device and the video decoding device. Alternatively, the video encoding device may encode information on the search region and then may signal the information on the search region to the video decoding device. Here, the information on the search region is information indicating the size and location of the search region.

When the search region is an arbitrary region, as illustrated in FIG. 7, the index may indicate one of the first region, second region, third region, and fourth region (R1, R2, R3, and R4) as the search region. The first region is a previously reconstructed region in the current CTU including the current block. The second region and third region are an L-shaped region having a predefined width and height at the top and left of the current CTU with the L-shaped region being bisected diagonally into two regions that are the second region and third region. The fourth region is an L-shaped region that has a predefined width and height at the top and left of the current CTU and is located outside the second region and third region.

When the search region is set in CTU units, as illustrated in FIG. 8, the index may indicate, as search region, one of the previously reconstructed region within the current CTU containing the current block, the upper left CTU of the current CTU, the upper CTU of the current CTU, and the left CTU of the current CTU.

Meanwhile, the search region may be determined as a processing unit for pipelined parallel processing. For example, as illustrated in FIGS. 9-12, the processing unit may be a VPDU.

When the search region is set as a processing unit and the search regions are included in one CTU, the index may indicate, as the search region, one of the previously reconstructed region within the current processing unit containing the current block, the left processing unit region of the current processing unit, the top processing unit of the current processing unit, and the top left processing unit of the current processing unit.

Additionally, when the search region is set as a processing unit, and the search regions are included in the current CTU or previous CTU, the index may indicate, as the search region, the previously reconstructed region in the current processing unit containing the current block or may indicate, as the search region, one processing unit within a preset number of processing units that are reconstructed previously to the current processing unit in the Z-order. Here, the current processing unit is included in the current CTU, and a preset number of processing units may be included in the current CTU or the previous CTU.

The video encoding device sets the search region by using the information on the search region (S1304).

The video encoding device sets a template from pixels spatially adjacent to the current block (S1306).

The video encoding device performs a template matching-based search in the search region to search for a similar template with the highest similarity to the template (S1308).

The video encoding device may use a cost function to calculate the similarity between the template of the current block and the candidate template in the search region. At this time, the template with the smallest cost function value may be selected as the similar template. Additionally, when the template of the current block is larger than the predefined width or height, the video encoding device may use the pixels obtained by sub-sampling the template of the current block and the candidate template to calculate the cost function value.

The video encoding device determines a matching block with the current block based on the similar template and selects the matching block as an intra predictor (S1310).

The video encoding device subtracts the intra predictor from the current block to generate a residual block (S1312).

The video encoding device encodes the index and residual block to generate a bitstream (S1314).

FIG. 14 is a flowchart of a video decoding method according to at least one embodiment of the present disclosure.

The video decoding device decodes an index and a residual block from the bitstream (S1400). Here, the index indicates a search region that is one of one or more search regions. Additionally, the search region is a portion of the previously reconstructed region in the current picture.

Following the same method as that of the video encoding device, the index of the video decoding device may also indicate the search region.

The video decoding device uses information on the search region according to the index to set the search region (S1402). The information on the search region may be defined in advance according to an agreement between the video encoding device and the video decoding device. Alternatively, the video decoding device may decode the information on the search region, which is delivered after being encoded by the video encoding device. Here, the information on the search region is information indicating the size and location of the search region.

The video decoding device sets a template from pixels spatially adjacent to the current block (S1404).

The video decoding device performs a template matching-based search in the search region to search for a similar template with the highest similarity to the template (S1406).

The video decoding device may use a cost function to calculate the similarity between the template of the current block and the candidate template in the search region. At this time, the template with the smallest cost function value may be selected as the similar template.

The video decoding device determines a matching block with the current block based on the similar template and selects the matching block as an intra predictor (S1408).

The video decoding device adds the residual block and the intra predictor to reconstruct the current block (S1410).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

122: intra predictor
155: entropy encoder
510: entropy decoder
542: intra predictor

What is claimed is:

1. A method performed by a video decoding apparatus for decoding a current block, the method comprising:
    decoding, from a bitstream, an index indicating a target search region that is one of multiple search regions, the search region being a portion of a previously reconstructed region in a current picture;
    setting the target search region based on the index;
    setting a template from pixels spatially adjacent to the current block;
    searching for a similar template with a highest degree of similarity to the template by performing a search based on template matching in the target search region; and
    determining a matching block with the current block based on the similar template and selecting the matching block as an intra predictor,
    wherein the multiple search regions are formed with both a current virtual pipeline data unit (VPDU), which contains the current block, and three consecutive VPDUs, that precede the current VPDU in decoding order, on a current coding tree unit (CTU) row.

2. The method of claim 1, wherein searching for the similar template comprises:
    searching for the similar template based on a cost function that calculates similarities between the template and candidate templates in the target search region.

3. The method of claim 2, wherein searching for the similar template comprises:
    when the template is larger than a predefined width or a predefined height, calculating a value of the cost function by using pixels obtained by sub-sampling the template and the candidate templates.

4. The method of claim 1, further comprising:
    decoding a residual block from the bitstream; and
    reconstructing the current block by adding the intra predictor and the residual block.

5. A method performed by a video encoding apparatus configured to encode a current block, the method comprising:
    determining an index indicating a target search region that is one of multiple search regions, the search region being a portion of a previously reconstructed region in a current picture;
    setting the target search region based on the index;
    setting a template from pixels spatially adjacent to the current block;
    searching for a similar template with a highest degree of similarity to the template by performing a search based on template matching in the target search region; and
    determining a matching block with the current block based on the similar template and selecting the matching block as an intra predictor,
    wherein the multiple search regions are formed with both a current virtual pipeline data unit (VPDU), which contains the current block, and three consecutive VPDUs, that precede the current VPDU in encoding order, on a current coding tree unit (CTU) row.

6. The method of claim 5, further comprising:
    generating a residual block by subtracting the intra predictor from the current block; and
    encoding the index and the residual block.

7. A method for providing a video decoding apparatus with video data, the method comprising:
    encoding the video data into a bitstream; and
    transmitting the bitstream to the video decoding device,
    wherein encoding the video data comprises:
        determining an index indicating a target search region that is one of multiple search regions, the search region being a portion of a previously reconstructed region in a current picture;
        setting the target search region based on the index;
        setting a template from pixels spatially adjacent to a current block;
        searching for a similar template with a highest degree of similarity to the template by performing a search based on template matching in the target search region; and
        determining a matching block with the current block based on the similar template and selecting the matching block as an intra predictor,
        wherein the multiple search regions are formed with both a current virtual pipeline data unit (VPDU), which contains the current block, and three consecutive VPDUs, that precede the current VPDU in encoding order, on a current coding tree unit (CTU) row.

* * * * *